United States Patent [19]

Segen

[11] Patent Number: 5,484,966
[45] Date of Patent: Jan. 16, 1996

[54] SENSING STYLUS POSITION USING SINGLE 1-D IMAGE SENSOR

[75] Inventor: Jakub Segen, Fair Haven, N.J.

[73] Assignee: AT&T Corp., Murray Hill, N.J.

[21] Appl. No.: 163,419

[22] Filed: Dec. 7, 1993

[51] Int. Cl.[6] .......................... G08C 21/00; G01B 11/14
[52] U.S. Cl. .......................... 178/18; 356/375; 250/206.1
[58] Field of Search .......................... 178/18, 19; 345/157, 345/158, 180; 356/152, 375; 359/223, 207; 250/206.1

[56] References Cited

U.S. PATENT DOCUMENTS

| | | | |
|---|---|---|---|
| 4,710,760 | 12/1987 | Kasday | 340/712 |
| 4,762,990 | 8/1988 | Caswell et al. | 250/221 |
| 4,782,328 | 11/1988 | Denlinger | 340/365 |
| 4,873,398 | 10/1989 | Hubby, Jr. | 178/18 |
| 5,164,585 | 11/1992 | Lieu | 345/180 |

FOREIGN PATENT DOCUMENTS 2204126  11/1988  United Kingdom ........... G06K 11/06

OTHER PUBLICATIONS

Patent Abstracts of Japan, vol. 15, No. 309 (P–1235), 7 Aug. 1991 and JP-A-31 008 603 (Daihatsu Motor Co. Ltd.) 8 May 1991, Abstract Only.

Primary Examiner—Stephen Chin
Assistant Examiner—Kevin Kim

[57] ABSTRACT

An apparatus and method for determining the location of an object in an active area of a first plane. The apparatus includes a first reflecting device, disposed substantially perpendicular to the first plane at a periphery of the active area. The first reflecting device receives a first image of the object from the active area and reflects the first image back toward the active area substantially parallel to the first plane. A second reflecting device, disposed substantially perpendicular to the first plane at a periphery of the active area, receives a second image of the object from the active area and reflects the second image back toward the active area substantially parallel to the first plane. The second reflecting device is disposed at a first angle which is less than one-hundred eighty degrees to the first reflecting device. The angle opens toward the active area and toward a detecting device. The detecting device is disposed in the first plane at a periphery of the active area opposite the first and second reflecting devices. The detecting device receives the first image and the second image and produces a signal indicating the position of the first and second images.

6 Claims, 3 Drawing Sheets

SENSING STYLUS POSITION USING SINGLE 1-D IMAGE SENSOR

BACKGROUND OF THE INVENTION

1. Field of the Invention

The present invention relates to sensing the position of an object in a plane and, more specifically, sensing the position of a stylus on a surface using a single camera and two mirrors.

2. Related Art

Users of pen-based computers generally input dam into a computer by writing with a special electronic stylus directly on the computer's liquid-crystal screen, rather than by typing on a keyboard. Program choices can be made by checking boxes on the screen, as if one is filling out an electronic form. Documents can be edited by making movements with the stylus on the screen, such as crossing out a word. Diagrams can be drawn directly on the screen.

When designing a pen-based computer system a significant consideration is determining the position of the pen or stylus. Many different techniques have developed to detect the stylus position. However, significant drawbacks still exist. The sensing (detecting) technology must be lightweight, consume little electronic power, be durable and withstand electromagnetic interference from other parts of the computer.

Moreover, capturing handwriting requires the system to be accurate to within, for example, five thousandths of an inch. This level of accuracy is far more difficult to achieve than that required in other applications such as determining whether a finger is pointing to the "deposit" box or the "withdrawal" box on the touch screen of an automated teller machine. If the pen-sensing system makes even small errors, the computer might not be able to make fine distinctions, such as discriminating the letter "Z" from the number "2," no matter how proficient the computer's handwriting-recognition software is. Without a highly precise mechanism for sensing the position of the stylus these computer systems will not reliably and accurately function.

In addition to reliability and accuracy, the position sensing mechanism must be cost effective, durable and, easy to use. Some technologies, for instance, require the stylus to be connected to the computer by a wire, while others allow for a stylus to be detached. In general, it is desirable for a stylus to be detachable from the computer and the sensing device in order to improve the system's flexibility. However, the cost of manufacturing the stylus should not be excessive since a detachable stylus may be easily misplaced.

In addition, some previous systems require the stylus to touch the screen in order to be detected. Other systems can detect the stylus when it is merely near the screen. It is desirable to have the ability to sense the stylus before it touches the screen in order to help the computer system provide instant feedback.

There are three basic pen-sensing technologies. One is a resistive coating technique in which the front of a screen is coated with indium-tin oxide, a transparent material that conducts electricity. The voltage in this coating is made to vary gradually from the top to the bottom of the screen and from the left to the right of the screen. When the stylus contacts the coating, an electrical current flows through the stylus and is transmitted to the computer via a wire. Since the voltage varies across the screen, the amount of electricity flowing through the stylus will vary depending on where it touches the screen. This technology is inexpensive. However, this technology requires the stylus to be wired to the computer and to make contact with the screen in order for the stylus position to be detected. In addition, since the coating is on the front of the screen, it is subject to wear.

A second approach uses electromagnetic waves, essentially a faint radio transmission from the stylus to the computer or vice versa. A grid of wires behind the screen emits a signal which causes a circuit in the stylus, which is tuned to the signal frequency, to resonate and transmit a signal of its own. The computer then stops transmitting and listens for the signal from the stylus. The position of the stylus is determined by the position of the wires in the grid which detect the signal emanating from the circuit in the stylus.

This second approach can sense the stylus location before it touches the screen. In addition, the stylus need not be connected to the computer by a wire and may be an unpowered, passive circuit. However, this system is expensive, with a stylus costing $80 or more. In addition, the grid of wires behind the screen make it more difficult for screens to be backlit. Therefore, screens using this system are typically more difficult to read.

A third approach is similar to the electromagnetic one, i.e., the second approach, but senses by electrostatic coupling rather than electromagnetic coupling. This system can also detect the stylus without requiring the stylus to contact the screen. However, the stylus must be active and therefore must either be wired to the computer or contain a battery. Styluses using this approach are less costly than those in the second approach, but they remain relatively expensive.

As is seen from the above discussion, in all three of the above approaches the drawing surface must be specially designed in order to determine the stylus location. That is, in the first approach, the drawing surface is coated with an indium-tin oxide. In the second and third approaches, a grid of wires must be positioned beneath the drawing surface.

What is needed is a system for accurately sensing the location of a stylus in a plane. The stylus should not require connection to the computer or to a drawing surface. The sensor should be compact while not requiring a special surface coating or an embedded wire grid. The system should be able to sense the position of the stylus before the stylus physically contacts an object such as a drawing surface. In fact, a drawing surface should not be required to determine the stylus position. In addition, the system should be durable and inexpensive to build and maintain.

SUMMARY OF THE INVENTION

The present invention is an apparatus and method for determining the location of an object in an active area of a first plane. The apparatus includes a first reflecting device, disposed substantially perpendicular to the first plane at a periphery of the active area. The first reflecting device receives a first image of the object from the active area and reflects the first image back toward the active area substantially parallel to the first plane. A second reflecting device, disposed substantially perpendicular to the first plane at a periphery of the active area, receives a second image of the object from the active area and reflects the second image back toward the active area substantially parallel to the first plane. The second reflecting device is disposed at a first angle which is less than one-hundred eighty degrees to the first reflecting device. The angle opens toward the active area and toward a detecting device. The detecting device is disposed in the first plane at a periphery of the active area opposite the first and second reflecting devices. The detecting device receives the first image and the second image and produces a signal indicating the position of the first and second images.

In the preferred embodiment, the invention is implemented in a notebook computer system. The invention precisely determines the location of the stylus without requiring the stylus to be connected to the sensing device and without requiring a writing tablet or other surface beneath the stylus.

BRIEF DESCRIPTION OF THE FIGURES

The foregoing and other objects, features and advantages of the invention will be apparent from the following more particular description of the preferred embodiments of the invention, as illustrated in the accompanying drawings, wherein.

DETAILED DESCRIPTION OF THE PREFERRED EMBODIMENTS

A preferred embodiment of the invention is now described with reference to the figures, where like reference numbers indicate identical or functionally similar elements. Also in the figures, the left most digit of each reference number corresponds to the figure in which the reference number is first used. While specific steps, configurations and arrangements are discussed, it should be understood that this is done for illustrative purposes only. A person skilled in the relevant art will recognize that other steps, configurations and arrangements can be used without departing from the spirit and scope of the invention.

The present invention is an apparatus and method for sensing the position of an object, e.g., a stylus, in a two-dimensional plane using a one-dimensional sensing device. In the preferred embodiment, the invention is implemented in a notebook computer. In this illustrative embodiment, the stylus need not be tethered to the computer system. Stylus position can be determined without requiring the stylus to contact any portion of the computer system. In addition, a special stylus tablet is not required.

Figure 1:
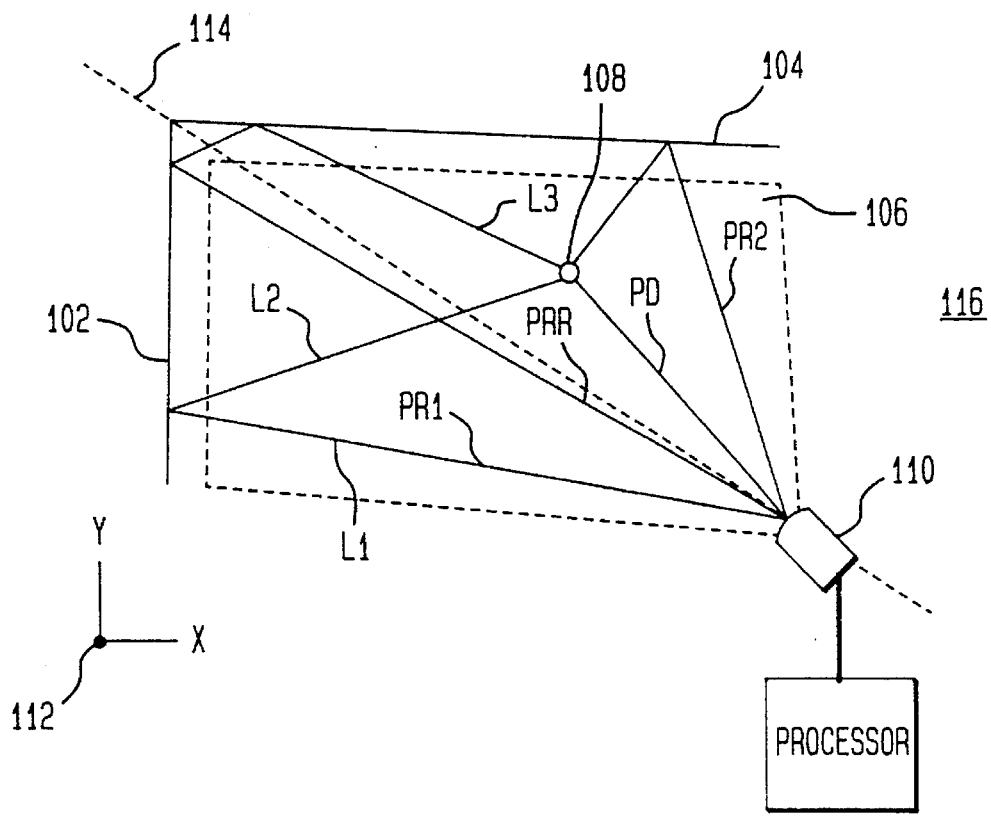
FIG. 1 is a top view diagram illustrating the operation of a preferred embodiment of the present invention.

Referring first to FIG. 1, the invention includes two reflective devices. In a preferred embodiment, these reflective devices are mirrors 102, 104, which are perpendicularly coupled to each other at one end. A viewing plane 116 is defined by the drawing sheet of FIG. 1. The viewing plane 116 is substantially perpendicular to the reflecting surface of the mirrors 102, 104. An active area 106 of the system is in the viewing plane 116. A stylus 108 is placed into the viewing plane 116. Numerous images, e.g., between two and five images depending on the angle between the mirrors 102, 104 (described below), are received by a single image sensing device 110. The image sensing device 110 is positioned in the viewing plane 116. Image sensing device 110 then determines the two dimensional position of the stylus 108 in the viewing plane 116 based on the received images.

The elements of the present invention will now be discussed in greater detail. Each mirror 102, 104 has a reflecting material on the surface facing the active area 106 to minimize refraction errors. A mirror having a glass surface, such that a ray of light must enter the glass before being reflected, can be used in the present invention. However, errors due to light refraction will affect the accuracy of the system. Therefore, it is preferred that the reflective coating be on the surface nearest the active area 106.

The mirrors 102, 104 are perpendicularly coupled such that the reflecting surfaces are perpendicular to the viewing plane 116 defining the active area 106.

In a preferred embodiment, the reflective surfaces of the mirrors 102, 104 are substantially flat and are long enough to ensure that all reflections of a stylus 108, positioned in an active area 106, reach the sensing device 110. In the preferred embodiment, the height of the mirrors 102, 104 can be small because the viewing plane 116 defining the active area 106 is perpendicular to the reflecting surface of each mirror.

As discussed above, some computer systems use a stylus which is complex and/or expensive. The stylus 108 of the present invention is neither complex nor expensive. In the preferred embodiment, a pen-light, e.g. Radio Shack catalog number 61-2538, can be used as the stylus. Alternate embodiments of the stylus include a pencil or a finger. These embodiments are discussed below.

Figure 3:
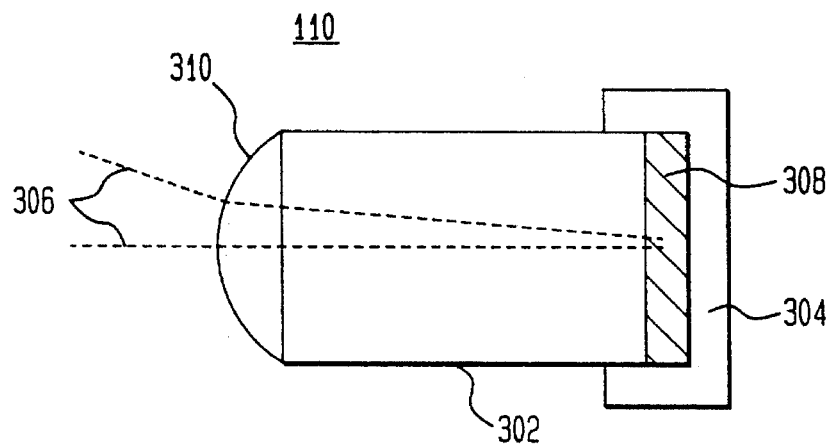
FIG. 3 is a top cross-sectional view illustrating the operation of a sensor of the present invention.
Figure 4:
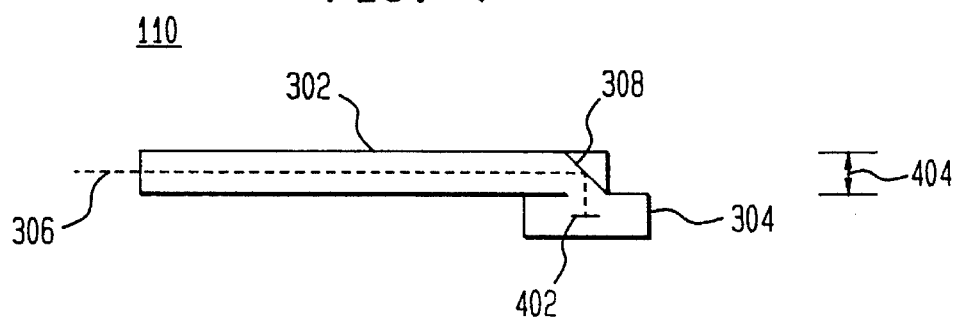
FIG. 4 is a side cross-sectional view illustrating the operation of the sensor of the present invention.

In the preferred embodiment, the sensing device is a line-scan camera which forms a one-dimensional image of the active area 106 within the viewing plane 116. The sensing device 110 will now be discussed with reference to FIG. 3 and FIG. 4. The image sensing device 110 consists of a projective element 302, and a sensing element 304. The projective element can be a pinhole or an optical system consisting of one or more lenses and/or mirrors. The projective element forms an optical one-dimensional image of the active area 106 within the sensor element 304 by projecting a perspective projection from a two-dimensional plane 116 to a one-dimensional line 402. It is preferred that the view angle of the projective element 302 be at least 90 degrees, to cover a quadrilateral formed between the two mirrors and the optical center of the sensing device 110. In the preferred embodiment, this quadrilateral, with some modifications described below, is the active area 106.

In the preferred embodiment, the sensing device 110 is a line-scan imaging device, sometimes referred to as a linear imaging device (LID), for example a linear charged coupled device (CCD) array. Its face plate contains a linear sensor, i.e., a line of light sensing elements. A one-dimensional image is projected onto its sensing elements and is converted into analog electrical signals.

The analog output of the sensing element is converted to a digital format within the sensing element by a processing device (not shown), or by a separate analog-to-digital conversion device (not shown). The detailed structure and operation of the sensing device 110 will be apparent to persons skilled in the relevant art.

A preferred configuration of the sensing device 110 consists of a linear CCD sensor 304, for example, a Fairchild CCD143A or CCD145, and a projective element 302 that projects a one-dimensional image at a right angle to the viewing plane 116. When using a Fairchild CCD145 linear CCD sensor, the projective element 302 would consist of a lens system 310 having a focal length of approximately 12 mm whose optical axis lies in the viewing plane 116.

The sensing device 110 includes a planar mirror 308 oriented at approximately 45 degrees to the viewing plane 116. This planar mirror 308 projects a one dimensional image onto the face plate 402 of the CCD sensor 304. Typically, the face plate 402 is parallel to the viewing plane 116 and slightly below it. The face plate 402 is also orthogonal to the optical axis of the lens.

In the preferred embodiment, i.e., when the mirrors 102, 104 are coupled together perpendicularly, the sensing device 110 senses four images if the stylus 108 is in the active area 106 of the viewing plane 116. The sensing device 110 outputs a vector of electrically encoded analog or digital values, i.e., v[i], i=1, ... N, where N is the number of pixels of the linear CCD sensor, and where v[i] approximately represents the light intensity received at the optical center of the sensing device 110 from direction D[i], integrated over a specific time interval.

In the preferred embodiment, when a stylus 108 is placed within the active area 106 four images are received by the sensing device 110. Four images are received by the sensing device because light emitting from the stylus 108 can enter the sensing device via four distinct paths. An illustration of the light paths is shown in FIG. 1. Light emitting from the stylus enters the sensing device 110: (1) directly via path PD, which is termed the direct image; (2) by reflecting off mirror 102 via path PR1, which is termed a single reflected image; (3) by reflecting off mirror 104 via path PR2, which is also termed a single reflected image; and (4) by reflecting off both mirror 104 and mirror 102 via path PRR, which is termed a double reflected image.

In the preferred embodiment, the sensing device 110 outputs a vector of digital electrical signals representing a one-dimensional image of the images from the two-dimensional active area 106. There are numerous methods for determining the two-dimensional position of the stylus 108 from this one-dimensional image.

A processor (not shown) receives the vector of digital electrical signals representing the images of the stylus 108, output from the sensing device 110. The processor compares the vector values with a fixed threshold value T1. Pixels having a value above this threshold are called "white". The "white" pixels are represented by a binary "1". Pixels whose value is below this threshold are called "black". In the preferred embodiment, the white pixels are combined into maximally connected regions or runs. A run is a continuous chain of white pixels. The length of the run is defined by the number of pixels in the run. Runs shorter than a threshold T2 are eliminated. The value of T2 depends upon the resolution of the sensing device. Each run longer than T2 represents one highlight. The position of a highlight in the 1-D image is computed with sub-pixel accuracy, by fitting a unimodal function, described below, to the values of the pixels in the run. The location of a mathematical mode of the run is then determined. Typical choices for this unimodal function are a parabola or a gaussian function. It will be apparent to one skilled in the relevant art as to how these functions are applied to the pixel values in the run. Using the above process, the processor determines a set of highlight positions, each position represented, for example, as a rational number ranging from 1 to N (N being equal to the number of pixels representing the one-dimensional image of the active area 106).

In order to determine the position of the stylus 108 the light rays received from each image must be traced back to the stylus 108. This can be done in many ways. One technique for determining the stylus position 108 is described below. In the preferred embodiment four highlights exist, as described above. Each highlight point is a one-dimensional representation of a two-dimensional line in the plane of the active area 106. The locations of the mirrors are known. Therefore, the reflected path of each ray of light can be determined. The position where all four paths intersect is the stylus location. The preferred technique for calculating the stylus position is detailed below.

To facilitate determining the stylus position, a cartesian coordinate system is chosen to represent the plane of the active area 106. The origin of the coordinate system is identified by reference number 112. The positive x-axis extends toward the sensing device 110, i.e. to the right, the positive y-axis extends along the left mirror, i.e., upwards. The line between the sensing device center and the point where the two mirrors meet will be called the diagonal axis 114.

A highlight position represents a single ray of light entering the sensing device 110. This ray can be represented as a 2-D line on the viewing plane 116. The equation of this line is obtained from calibration parameters of the sensing device 110. These parameters can be determined from a measurement of the values x, y, and u, using procedures which is;incorporated herein by reference described in the book, O. D. Faugeras, *Three-Dimensional Computer Vision*, MIT Press, Cambridge, Mass., 1992 (restricted to a plane). While it will be apparent to one skilled in the relevant art how these values are determined, a brief discussion is provided below.

The following sensing device model is used. If the position P of the stylus in the active area 108 is a point on the viewing plane 116 with coordinates x and y, then the image of P will be a point with position "u" in the 1-D image. The value of u must be between 1 and N as defined above. The relationship between, x, y, and u, i.e., the location of the stylus 108 and the one-dimensional image of the stylus, is given by Equation [1]:

$$(dx+ey+1)u=ax+by+c \quad [1]$$

The values a, b, c, d, and e, in Equation [1] are calibration parameters of the sensing device 110, which are assumed to remain constant in the preferred embodiment.

If a lens is present in the sensing device 110, the relationship between x, y, and u may vary from that given in Equation [1] since lenses distort the highlight position in the one-dimensional image. This distortion may be accounted for by replacing u in Equation [1] with a non-linear lens distortion function, f(u) which is constant for a given lens. The following analysis assumes that such a distortion function is not required to accurately describe the relationship between x, y, and u.

For a given value of u, Equation [1] describes a line which can be represented as:

$$Ax+By+C \quad [2]$$

where:

$A=ud-a;$ $B=ue=b;$ and $C=c-u.$

The line whose equation is given by Equation [2] is the line which represents the trace of a light ray entering the sense array 110. The stylus position 108 is located on the trace of the direct image PD, discussed above, which can be represented by Equation [2].

In the preferred embodiment, it is also necessary to determine the path of a light ray which enters the sensing device 110 after reflecting off one mirror, i.e., paths PR1 and PR2 of FIG. 1.

Given a line equation, L1, describing a ray after it is reflected from a mirror, and a line equation, M, describing the location of the mirror on a plane, then the equation of the ray before it is reflected, L2, is found as follows. Let the reflected ray equation, i.e., the equation representing the path of the light ray entering the sensing device 120 after being reflected, be equal to:

$$L1: Ax+By=C \qquad [3]$$

and let the mirror equation be:

$$M: Dx+Ey=F \qquad [4]$$

The point of reflection [rx,ry] is the intersection of lines L1 and M. The coordinates of this point, rx and ry, are found by solving the above two equations for x and y.

For simplicity, the following values are defined:

$$h=2(AD+BE)/(D^2+E^2) \qquad [5]$$

$$Q=hD-A \qquad [6]$$

$$R=hE-B \qquad [7]$$

Using these values, the equation for the light ray before the reflection, L2, is:

$$L2: Qx+Ry=Q\times rx+R\times ry \qquad [8]$$

The geometry of the mirrors 102, 104 and the sensing device 110 are such that the single reflection images, i.e., those whose path is PR1 and PR2 are always the right-most and left-most images sensed by the sensing device 110. Therefore, Equation [8] is used to solve for the path of these two image paths PR1, PR2. The point at which the two paths intersect is the stylus position 108. However, in order to minimize errors, the trace of the other images, i.e., the direct image trace PD and the double reflected image trace PRR are determined. We can then solve for two variables, i.e, x and y, using four equations. A technique for solving for these equations is described below.

The line defined by Equation [8] represents the path of the light ray L2 before reflecting off of a mirror and entering the sensing device 110. In the preferred embodiment it is also necessary to determine the trace of a light ray which enters the sensing device 110 after reflecting off both mirrors 102, 104, i.e., path PRR of FIG. 1.

As discussed below, which of the two middle images is the double reflected image is not immediately known. Therefore, in order to determine which is the double reflected image, each image is assumed to be a double reflected image and the calculations proceed under this assumption. The assumption having the lowest error, discussed below, is deemed to be the double reflected image.

If a light ray, L1 (whose path is described by Equation [3]), which enters the sense device 110, is assumed to be a result of a double reflection from two mirrors, then a line L3 describes this ray before the first of the two reflections. The path of L3 is determined as follows. M1 represents a line describing the position of the left mirror 102, and M2 represents a line describing the position of the upper mirror 104. The corner point between the two mirrors [cx, cy] is the intersection of the lines M1 and M2. This intersection can be found by solving the line Equations M1 and M2 for x and y. The equation of the trace of the light ray entering the sensing device, L1, is:

$$L1: Ax+By=C, \qquad [3]$$

To find L3 the order of the reflections must be determined. That is, it must be determined which mirror 102, 104 a light my leaving the stylus 108 first contacts. With the coordinate system described above, parameter "C" is never equal to zero if line L1 is a double reflection. This is because the origin of the coordinate system 112 is outside the active area 106. Therefore, if C=0 we reject the assumption that the highlight is the result of a double reflection and stop the computation. Otherwise, a test value, T, is computed according to Equation [9].

$$T=(A\times cx+B\times cy)/C \qquad [9]$$

If T<1, then the light ray emanating from the stylus reflects first off of mirror 102 and then off of mirror 104. If T>1, then the light ray emanating from the stylus reflects first off of mirror 104 and then off of mirror 102. If T is approximately equal to 1 then the ray either comes directly from the source, i.e, path PD, or the light ray is a double reflection which overlaps with the path of the direct ray PD. In both situations the ray is treated as if it were a direct ray, PD, and the double reflection computation need not continue.

Once we determine which mirror a light ray emitted from the stylus 108 first contacts, the path of the light ray before the first reflection, L3, can be calculated by using the technique described above. The pre-reflected path can be determined by first calculating the path of the light after a single reflection, using Equation [8], and then using this result to calculate the path of the light before the first reflection.

In the preferred embodiment, there are always two single reflected images, one direct image, and one double reflected image. However, the number of identified highlights may be smaller than the number of images. This occurs because within a certain region near the diagonal axis 114, the highlight from a double reflection will merge with the direct image highlight, discussed above. This causes the direct image and the double reflected image to appear together in the one-dimensional sensor and therefore the two images appear as only one blurred image in the sensing device 110. If the stylus position 108 is close to one of the mirrors 102, 104 then a single reflection image may merge with the direct image. This overlapping of the direct image and a single reflected image is avoided by separating the active area 106 from the mirrors 102, 104 as is shown in FIG. 1.

As discussed below, the highlights corresponding to the left-most and right-most rays from the perspective of the sensing device 110 will be referred to as left-most and right-most highlights (images), respectively. When the double reflected image and the direct image overlap, only three highlights are identified by the computer. From the perspective of the sensing device 110, the left-most highlight represents the single reflected image which reflects off of mirror 102. The right-most highlight represents the single reflected image which reflects off of mirror 104. The middle image is the direct image. The path of the pre-reflected path is determined for each highlight as discussed above.

There are two unknown variables, x and y, and there are three equations, one equation for the pre-reflected path of each highlight. This situation is termed an overdetermined system of linear equations. Traditionally, such problems are solved by error minimization. An error of a system of linear equations is defined. For example, this error can be defined as the sum of squared errors from individual equations, or as the maximum of absolute errors of equations. The techniques for solving an overdetermined system of linear equations for minimal error will be apparent to persons skilled in the relevant art.

In the situation where four highlights are detected by the sensing device 110, the left-most highlight and the right-most highlight represent single reflected images. Difficulty is encountered in attempting to determine which of the two middle highlights represents the direct image and which of the two middle highlights represents the double reflected image. One technique for identifying the double reflected image from the direct image is to create two scenarios, each being an overdetermined system of four linear equations L1, L2, L3, and L4, with two unknowns. The first two of these equations are the traced single reflections L1 and L2. The remaining two equations are obtained from the two middle highlights. In the first scenario, we treat the first of the two middle highlights as a direct image. In the second scenario, we treat the second of the two middle highlights as a direct image. In both scenarios, the remaining middle highlight is treated as a double reflected image. In each scenario an equation is formed to represent the direct ray L3. Then the assumed double reflection is followed to find a line, represented by equation L4. The equations for each scenario are solved and the stylus position is selected as the solution whose associated error is smaller.

Using the above technique, the position of the stylus 108, i.e., locations x and y, is determined using a single sensing device and two mirrors. Other techniques for determining the stylus location based on the information provided by the sensing device 110 will be apparent to those skilled in the relevant art.

This technique can be extended to determine the position of multiple objects in an active area 106. Additionally, the orientation of objects may be detected. Another embodiment senses the movement of an object through the active area 106. Such a movement can be a finger, or multiple fingers, moving through the active area. The computer may be designed to interpret such a motion, e.g., sweeping a finger through the active area may equate to an "erase display" command.

The stylus of the present invention need not be coupled or tethered to the sensing device 110 or to the computer (not shown). The present invention does not require a light based stylus. A passive stylus such as a pen, a pencil or even a finger can be used. When using such a passive stylus with ambient light, the edges of the active area 106 which are opposite the mirrors 102, 104 should be lined with contrasting background strips. A good combination is a dark background with a light colored stylus, or a stylus with a reflective spherical tip to enable a sharper distinction between the stylus and the background.

Another embodiment uses a passive stylus and two diffused light sources. The light sources are placed along the edges of the active area 106 which are opposite the mirrors 102, 104. These light sources will form shadows of the stylus which will be detected by the sensing device 110. Many opaque items, e.g., a pen, a pencil or a finger, can be used as a passive stylus. In this situation the computer will determine the highlight position based on a run of black pixels instead of a run of white pixels.

It may be advantageous to reduce the number of images the sensing device 110 receive. If the double reflected image is eliminated then only three images are received by the sensing device 110. The trace of these three images are immediately known, i.e., the left-most image is a single reflected image from mirror 102, the right-most image is a single reflected image from mirror 104 and the middle image is the direct image. The double reflected image may be eliminated by placing a polarizing filter over each of mirrors 102, 104 such that the relative polarization angle between the two filters is ninety degrees. The detailed structure and operation of these polarizing filters will be apparent to persons skilled in the relevant art.

An alternate embodiment of the present invention is a technique for efficiently determining which of the middle images is the double reflected image. Two radiation intensity reducing filters are placed adjacent the mirrors 102, 104 or are built into the mirrors 102, 104. When the sensing device senses the images, the direct image will have the highest intensity and the double reflected image will have the lowest intensity. The intensity of the light emitting from the stylus is reduced twice, once by each mirror, for the double reflected image. The sensing device 110 can detect the intensity of the radiation it is receiving. Therefore, the middle highlight having the lower intensity represents the double reflected image. The detailed structure and operation of the radiation reducing filters will be apparent to persons skilled in the relevant art. Instead of utilizing radiation intensity reducing filters, a similar effect results from using two polarizing filter having a relative polarization angle between zero and ninety degrees.

Figure 2:
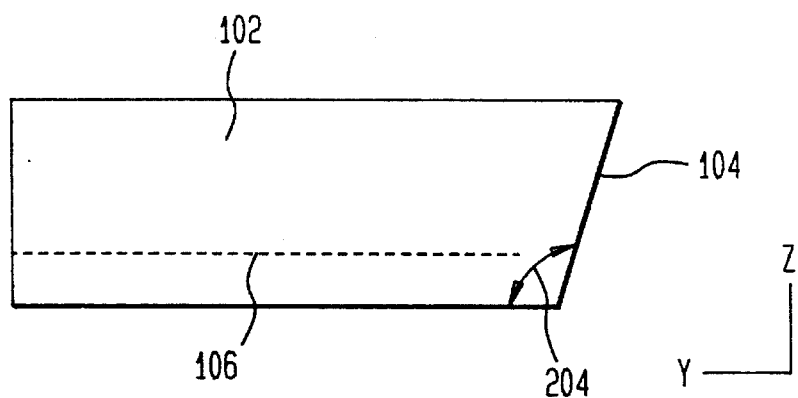
FIG. 2 is a side view diagram illustrating the operation of the preferred embodiment of the present invention.

In the preferred embodiment, the mirrors 102, 104 are positioned such that the reflective surface of each mirror 102, 104 is perpendicular to the viewing plane 116. However, in an alternate embodiment, one or both mirrors may be positioned such that the planes which are perpendicular to reflective surface of each mirror do not align with each other or with the viewing plane 116. An example of this can be seen in FIG. 2. FIG. 2 represent a side view of the present invention, i.e., looking directly into mirror 102.

In the preferred embodiment, the viewing plane 116, which includes the active area 106, is perpendicular to the reflecting surface of the mirrors 102 and 104. However, this is not required. For example, in FIG. 2 one mirror 102 is aligned according to the preferred embodiment, i.e., parallel to the Z-axis. However, the second mirror 104 is not aligned perpendicularly to the viewing plane 116, i.e., angle 204 is not ninety degrees. As angle 204 diverges from ninety degrees the height of the mirrors must increase in order to properly reflect a previously reflected image. In addition the height 404, in FIG. 4, of the receiving portion of the sensing device 110, i.e., the projective element 302, must increase to ensure that all images will be properly received by the sensing means 110.

Figure 5:
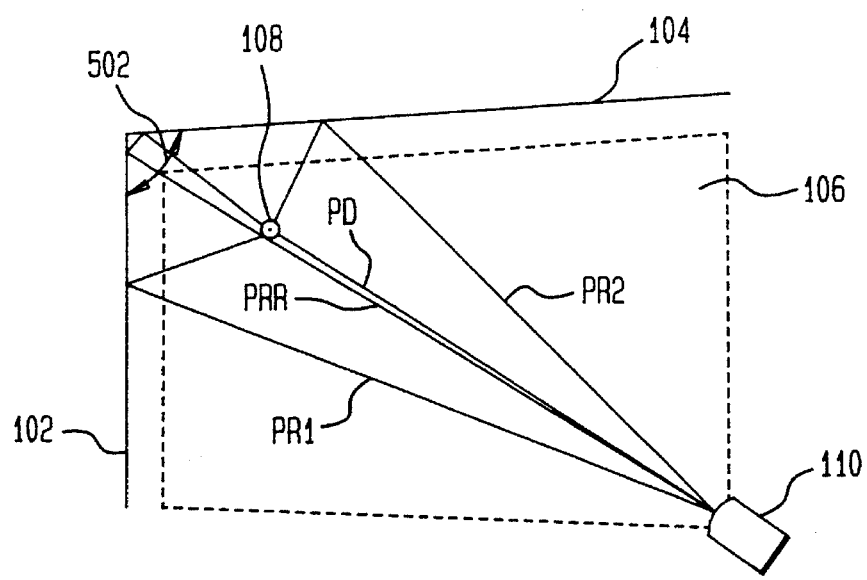
FIG. 5 is a diagram illustrating the operation of an alternate embodiment of the present invention having an obtuse angle between the mirrors.

In the preferred embodiment, the mirrors are perpendicularly coupled in the X-Y plane. In alternate embodiments of the present invention, the angle of connection, angle 502 in FIG. 5, diverges from ninety degrees. When solving for the stylus position 108, the mirror angle 502 can vary significantly from ninety degrees. In FIG. 5, the mirror connection angle 502 is obtuse, i.e., greater than ninety degrees. In some instances having an obtuse mirror angle 502 is an advantage over having a perpendicular mirror angle. Such an advantageous situation occurs when a direct image highlight is merged with a double reflection. This occurs when the stylus 108 is positioned on or near the diagonal axis 114. When this occurs, the sensing device 110 senses a blurred image, discussed above. This blurred image may result in a significant error when determining the stylus position.

When mirror angle 502 is obtuse, however, no such blurring occurs. Therefore, to prevent this type of error, the mirrors 102, 104 may be positioned such that an obtuse mirror angle 502 is formed.

The technique for determining the stylus position 108 when the mirror angle 502 is obtuse is the same as that described above in the preferred embodiment. In some situations only three images may appear. Therefore, in these situations it is necessary to solve for the two unknowns, x and y, with three equations. A technique for solving this system is described above.

Figure 6:
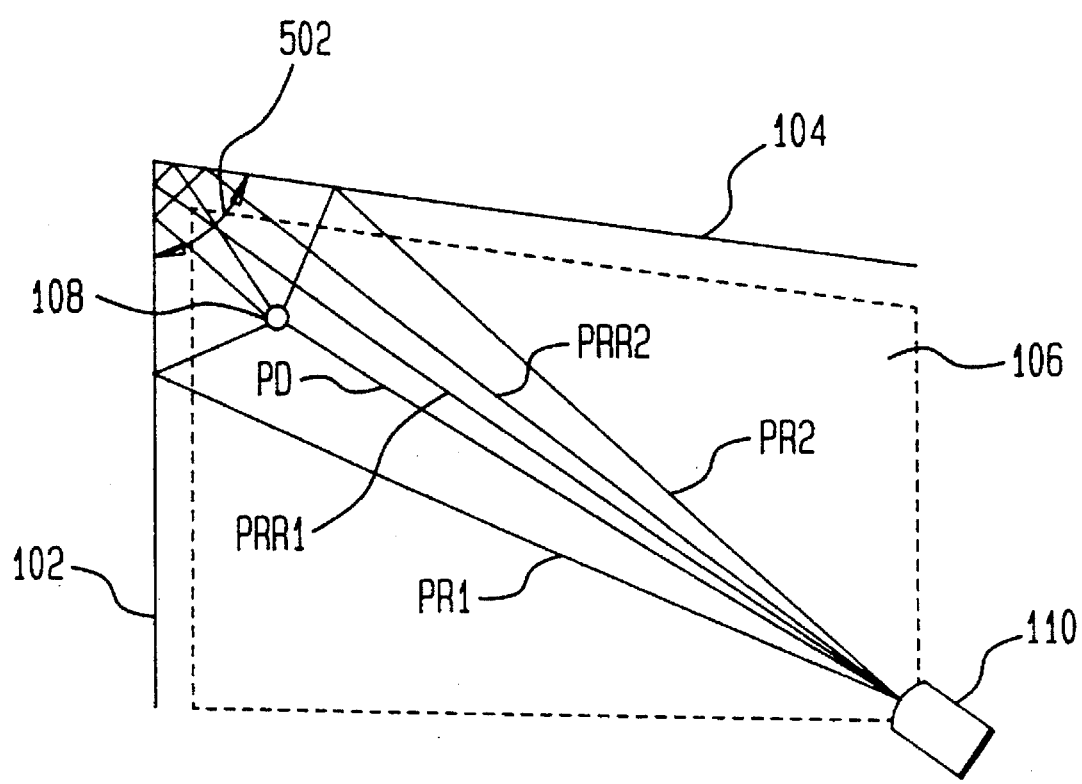
FIG. 6 is a diagram illustrating the operation of an alternate embodiment of the present invention having an acute angle between the mirrors.

The mirror angle 502 may also be acute, as shown in FIG. 6. In this situation a fifth image may be detected by the sensing device 110. This fifth image results from two images having double reflected traces, i.e., PRR1 and PRR2. The technique for determining the stylus position 108 when the sensing device 110 receives five images is similar to the technique described above when the sensing device 110 receives four images. Instead of solving two scenarios, three scenarios are solved. It is known that the left-most image and the right-most image are both traces of single reflected images. In each of the three scenarios, a different middle image is chosen as the direct image. Each scenario requires a solution to an overdetermined system of linear equations consisting of five equations, one for each image, having two unknowns, x and y. Therefore, as discussed above, each of the scenarios will have a solution and an associated error. The solution having the smallest associated error is selected as the stylus position. Alternatively, filters can be used to distinguish double reflections, as described above.

As the mirror angle 502 decreases, more than five images may be received by the sensing device 110. These additional images may be the result of double reflections, triple reflections or higher-order reflections. The object position may be determined using the techniques described above.

In some situations one or more images may be obscured, for example, if a user positions a hand on a tablet, i.e., within the viewing plane 116. If such a possibility is accounted for, the rule discussed above stating that the left-most and right-most highlights correspond to single reflections can not be used. One solution to this problem is found by forming scenarios that allow for some highlights to be obscured, and solving these scenarios as shown above. An alternative is to use filters for identification of highlights as described above.

An additional embodiment employs an active stylus which is equipped with a pressure sensor that relates light source intensity to the stylus pressure on the tablet.

While the invention has been particularly shown and described with reference to a preferred embodiment and several alternate embodiments thereof, it will be understood by persons skilled in the relevant art that various change in form and details may be made therein without departing from the spirit and scope of the invention.

What is claimed is:

1. An apparatus for determining the location of an object in an active area of a first plane, comprising:

first reflecting means, disposed substantially perpendicular to the first plane at a periphery of the active area, for receiving a first image of the object from the active area and for reflecting said first image back toward the active area substantially parallel to the first plane, said first reflecting means including a first polarization filter;

second reflecting means, disposed substantially perpendicular to the first plane at a periphery of the active area, for receiving a second image of the object from the active area and for reflecting said second image back toward the first plane, said second reflecting means disposed at a first angle which is less than one-hundred eighty degrees to said first reflecting means, said angle opening toward the active area, said second reflecting means including a second polarization filter; and detecting means, disposed in the first plane at a periphery of the active area opposite said first and second reflecting means, for receiving said first image and said second image and for producing a signal indicating the position of said first and second images, wherein a relative polarization angle between said first polarization filter and said second polarization filter is greater than zero degrees, for reducing the radiation intensity of a third image of the object, said third image being reflected off of said first reflecting means and said second reflecting means.

2. An apparatus for determining the location of an object in an active area of a first plane, comprising:

first reflecting means, disposed substantially perpendicular to the first plane at a periphery of the active area, for receiving a first image of the object from the active area and for reflecting said first image back toward the active area substantially parallel to the first plane, wherein said first reflecting means further comprises radiation intensity reducing means for reducing the radiation intensity of said first image;

second reflecting means, disposed substantially perpendicular to the first plane at a periphery of the active area, for receiving a second image of the object from the active area and for reflecting said second image back toward the active area substantially parallel to the first plane, said second reflecting means disposed at a first angle which is less than one-hundred eighty degrees to said first reflecting means, said angle opening toward the active area; and detecting means, disposed in the first plane at a periphery of the active area opposite said first and second reflecting means, for receiving said first image and said second image and for producing a signal indicating the position of said first and second images, wherein said detecting means further comprises radiation detecting means for detecting the radiation intensity of said first image for determining if an image received by said detecting means has reflected off one of said first reflecting means, said second reflecting means, neither said first reflecting means nor said second reflecting means, and both said first reflecting means and said second reflecting means.

3. A method for determining a location of an object in an active area of a first plane, the method comprising:

positioning a first polarization filter between said first reflecting means and the active area;

positioning a second polarization filter between said second reflecting means and the active area, wherein a relative polarization angle between said first polarization filter and said second polarization filter is greater than zero degrees, to reduce the radiation intensity of a double reflected image detected by said detecting means;

reflecting a first image of the object back into the active area substantially parallel to the first plane, from a first reflecting means located at a periphery of the active area;

reflecting a second image of the object back into the active area substantially parallel to the first plane, from a second reflecting means located at a periphery of the active area;

receiving said first image from said first reflecting means and said second image from said second reflecting means at a detecting means located in the first plane across the active area from said first and second reflecting means; and determining the position of the object in said first plane from said first image and said second image received at said detecting means.

4. The method of claim 3, wherein step (3) further comprises the step of passively receiving a third image directly from the object at said detecting means and wherein step (4) comprises the step of determining the position of the object from at least two of: said received first image, said received second image, and said received third image.

5. The method of claim 4, wherein step (3) further comprises the step of passively receiving a fourth image of the object, reflected from both said first and second reflection means, at said detecting means and wherein step (4) comprises the step of determining the position of the object from at least two of: said received first image, said received second image, said received third image, and said fourth received image.

6. The method of claim 5, wherein step (3) further comprises the step of passively receiving a fifth image, reflected from both said first and second reflection means, of the object at said detecting means and wherein step (4) further comprises the step of determining the position of the object from at least two of: said received first image, said received second image, said received third image, said fourth received image, and said fifth received image.

* * * * *